United States Patent [19]

Gupta et al.

[11] Patent Number: 4,482,114
[45] Date of Patent: Nov. 13, 1984

[54] INTEGRATED THERMAL ANTI-ICING AND ENVIRONMENTAL CONTROL SYSTEM

[75] Inventors: Alankar Gupta, Renton; Kenneth L. Waters, Federal Way, both of Wash.

[73] Assignee: The Boeing Company, Seattle, Wash.

[21] Appl. No.: 510,739

[22] Filed: Jul. 5, 1983

Related U.S. Application Data

[63] Continuation of Ser. No. 228,878, Jan. 26, 1981, abandoned.

[51] Int. Cl.³ .............................................. B64D 15/02
[52] U.S. Cl. ............................. 244/134 B; 244/53 B; 244/118.5
[58] Field of Search ............ 244/134 R, 134 B, 134 C, 244/53 B, 163, 117 A, 118 S; 60/39.09 D; 137/15.1, 15.2; 165/41, 44

[56] References Cited

U.S. PATENT DOCUMENTS

| | | | |
|---|---|---|---|
| 2,330,632 | 9/1943 | Seligman | 165/44 |
| 2,387,637 | 10/1945 | Bierly | 244/134 B |
| 2,499,832 | 5/1950 | Palmatier . | |
| 2,507,044 | 3/1950 | Palmatier . | |
| 2,563,054 | 8/1951 | Messinger . | |
| 2,777,301 | 1/1957 | Kuhn . | |
| 2,868,483 | 1/1959 | Krueger . | |
| 3,058,305 | 10/1962 | Leigh, Jr. . | |
| 3,058,695 | 10/1962 | Simonis . | |
| 3,083,546 | 4/1962 | Turek . | |
| 3,749,336 | 7/1973 | Christensen et al. | 244/134 B |
| 3,825,212 | 7/1974 | Darges et al. . | |
| 3,933,327 | 1/1976 | Cook et al. | 244/134 B |
| 3,981,466 | 9/1976 | Shah . | |
| 4,406,431 | 9/1983 | Henberger | 244/134 B |

FOREIGN PATENT DOCUMENTS 1357112 6/1974 United Kingdom .......... 60/39.09 D Primary Examiner—Trygve M. Blix
Assistant Examiner—Rodney Corl
Attorney, Agent, or Firm—Delbert J. Barnard

[57] ABSTRACT

Hot compressed air is bled from the compressor of an engine and a portion of it is directed through a flow through type indirect heat exchanger of ring form located within an annular chamber in the engine cowl which is partially formed by lip surfaces of the inlet. Such air gives up heat to low pressure air within such chamber which carries the heat to the inlet surfaces. The compressed air is then removed from the heat exchanger and is admixed with additional hot compressed air. A part of the mixture is delivered to a wing TAI subsystem and a second portion is used for cabin conditioning and pressurization.

37 Claims, 10 Drawing Figures

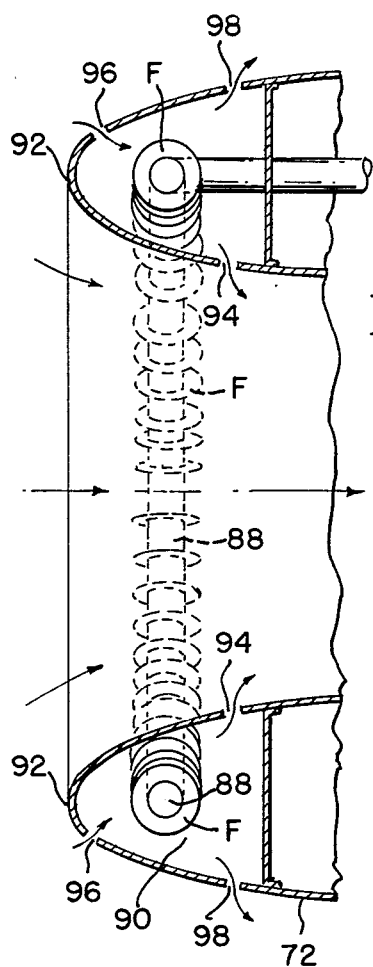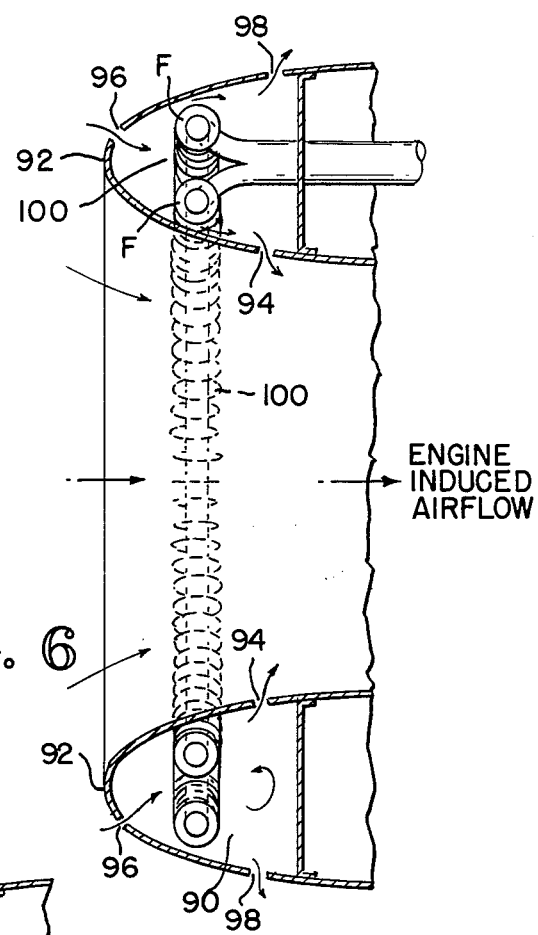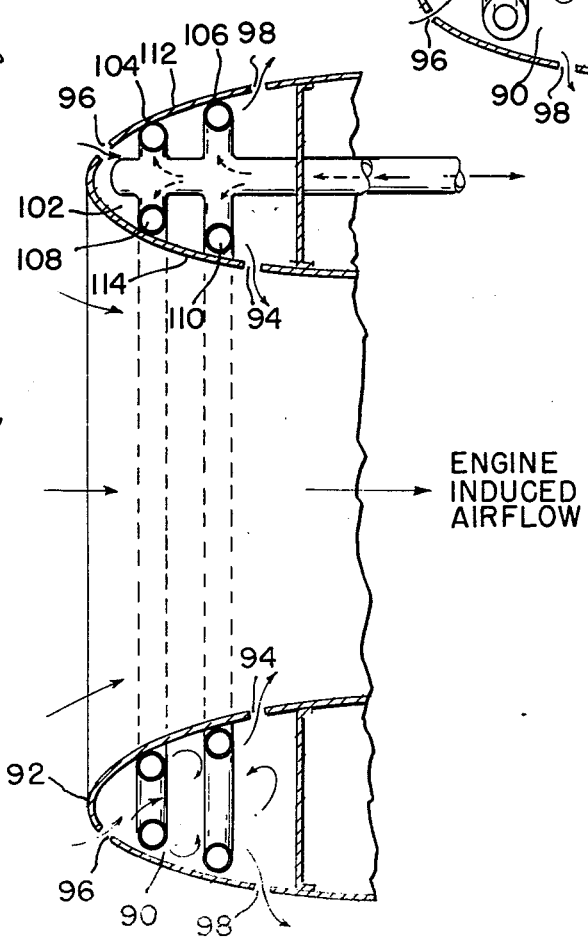

INTEGRATED THERMAL ANTI-ICING AND ENVIRONMENTAL CONTROL SYSTEM

This application is a continuation of application Ser. No. 228,878 filed 1/26/81 abandoned.

DESCRIPTION

1. Technical Field

The present invention relates to method and apparatus for using compressed air aboard an airplane as a heat source for preventing or removing ice formations on engine inlets and then using this same air for performing other pneumatic services aboard the aircraft. More particularly, it relates to system, method and component aspects of integrating the anti-icing function with other pneumatic services which are performed aboard an airplane in such a way that the peak/normal load on the air-source is minimized. The invention also relates to an improved way of ducting compressed air through an engine cowl to prevent or remove ice formation on the inlet.

2. Background Art

On modern aircraft, it is a common practice to use engine bleed-air (pneumatic power) for the operation of a number of services. These services can be classified in two categories—(i) continuous duty and (ii) on-demand. In the former category belong the cabin-conditioning and pressurization system and in the latter services such as engine inlet cowl thermal anti-icing (TAI), wing thermal anti-icing, thrust reverser, pneumatic drives, etc. Of the on-demand services the TAI systems (cowl and/or wing) are most critical for (i) they impose a large power demand and (ii) are used at periods when extraction of pneumatic power from the power plant is most undesirable (e.g. cowl TAI at take-off and cowl and wing TAI during climb). These demand services when operating can cause a large change in the normal pneumatic load (typical ratio of peak/normal load for present airplanes is 1.7 to 3.8) on the power source (main engines) and hence effect airplane performance and/or influence the design of the pneumatic system.

Large variations in peak/normal load in all types of power systems is undesirable, and aircraft pneumatic systems are no exception to the rule. Peak load controls system design and the power source, and when the system is normally operating at only a small fraction of the peak load, the system is inherently inefficient.

In the field of aircraft pneumatic system, substantial effort has been spent to reduce both the normal and peak load, as every ounce of bleed-air extracted from the engine results in either loss of engine thrust or additional fuel consumption or both. The past attempts have been primarily at the service level and have been limited to minimizing the power requirements of the various services. In the area of thermal anti-icing systems, various innovative techniques have been developed and exploited to increase the heat transfer efficiency and hence reduce the demand for pneumatic power (use of ejectors, double skin heat exchanger, etc.).

At the overall systems level, the efforts have been minimal. U.S. Pat. No. 3,981,466 granted Sept. 21, 1976, to Anil D. Shah (assignee The Boeing Company) and entitled "Integrated Thermal Anti-icing and Environmental Control System" (ECS), discloses a method of integrating cowl thermal anti-icing and environmental control systems wherein the bleed-air used to perform the cowl thermal anti-icing function is sequentially used for ECS. This reference patent states that the advantages of this integration scheme are: (i) a reduction in bleed-air requirement, and (ii) an elimination of conventional bleed-air precooler, its associated heat sink, associated ducting and controls.

The U.S. Pat. No. 3,981,466 presents a preferred method for performing the cowl TAI function through the use of a double skin heat-exchanger contained within the lip of the inlet. This preferred method requires that the cowl structure be designed to withstand internal pressures and temperatures that may occur during normal and failure conditions. These pressures and temperatures can be extremely high for modern fuel efficient high bypass ratio engines and thus necessitate the use of exotic materials. Note that engine cowls consist of flat surfaces (inner and outer walls, internal bulkhead), and high design pressures required can impose undesireable problems.

This invention presents an integration of continuous and on-demand services such that the peak/normal load on the air-source is minimized and high design pressures are avoided.

Other airplane TAI and/or cabin conditioning systems known in the patent literature are disclosed by the following U.S. Pats.: No. 2,499,832, granted Mar. 7, 1950, to Everett P. Palmatier; No. 2,507,044, granted May 9, 1950, to Everett P. Palmatier; No. 2,563,054, granted Aug. 7, 1951, to Bernard L. Messinger and Harry Drell; No. 2,777,301, granted Jan. 15, 1957, to John Kuhn; No. 2,868,483, granted Jan. 13, 1959, to Rudolph E. Krueger; No. 3,058,305, granted Oct. 16, 1962, to Leonard P. Leigh, Jr.; No. 3,058,695, granted Oct. 16, 1962, to Edward A. Simonis; No. 3,083,546, granted Apr. 2, 1963, to Robert F. Turek; No. 3,749,336, granted July 31, 1973, to Eric A. Christensen and Robert W. Schilling; and No. 3,825,212, granted July 23, 1974, to Walter Darges, John J. Karpis, George L. Petitgout and Walter G. Witbeck. These patents and the aforementioned U.S. Pat. No. 3,981,466 all speak for themselves and must be carefully studied in order to put the present invention into proper perspective relative to the prior art.

DISCLOSURE OF THE INVENTION

A basic aspect of the present invention is to provide a pneumatic service system aboard an aircraft in which hot compressed air (e.g. bleed air from an engine compressor) is passed through a first region requiring heat for combating ice formation and then on to another portion of the airplane to perform another pneumatic service.

In preferred form of both the system and method, a first portion of the hot compressed air is delivered through a flow through heat exchanger means in the first region requiring heat for combating ice formation. The effluent from said heat exchanger means is then admixed with another portion of the hot compressed air, and the temperature of the mixture is regulated, and such mixture is delivered to another station in the aircraft and used to provide an additional service, e.g. supplying the heat for combating ice formation and/or conditioning a cabin and/or cargo space.

The effluent from the heat exchanger means and the additional hot compressed air may be merely admixed in a conduit. Or, they may be mixed together in an ejector. For example, the additional hot compressed air may comprise the primary or "pumping" fluid in the ejector and the effluent from the heat exchanger means may comprise the secondary or "pumped" fluid.

A temperature sensing means may be located in the conduit leading from the heat exchanger and used for adjusting a valve in a conduit through which hot compressed air is delivered into the heat exchanger, for automatically controlling the flow rate of hot compressed air into the heat exchanger means as a way of maintaining the desired temperature of the effluent air. A second temperature sensing means may be located in the mixed fluid conduit downstream of the mixing ejector or juncture where admixing occurs, to be used for controlling a flow valve in the conduit which delivers the additional hot compressed air into admixture with the effluent from the heat exchanger means.

In a system utilizing an ejector type of mixer, it is preferred that the ejector be provided with a second inlet in communication with the atmosphere, and which includes a check valve designed to automatically open upon drop of pressure within the secondary flow path in the ejector, below the ambient pressure. This arrangement will prevent a negative pressure from being established in the heat exchanger. Also, in the event of a malfunction of the temperature sensing means in the duct leading out from the heat exchanger means, or the valve controlled by it, it permits the ejector to automatically induce ambient air to reduce the temperature of air supplied to a downstream subsystem.

In preferred form, the first portion of the hot compressed air is first delivered into a heat exchanger means within an annular chamber formed in the lip region of an inlet cowl, in indirect heat exchange with low pressure heat transfer air within such chamber. The low pressure air may be either ambient air, bleed air from the engine fan, or trapped air which is merely recirculated within the chamber, first over the heat exchanger, then to the cowl surfaces to be heated, and then back across the heat exchanger, etc.

According to one aspect of the invention, the chamber in the cowl surrounding the heat exchanger includes inlet openings at its front position to receive ram air during travel of the airplane, and outlet openings at a rear sidewall location where at the local pressure is lower, so that there will be an inducement of flow out through such outlet openings.

A basic advantage of the system and method of the present invention over the system and method disclosed by the aforementioned U.S. Pat. No. 3,981,466 is that the cowl thermal anti-icing air is contained in a duct (or ducts) such that the cowl cavity is not subjected to the high bleed-air pressures and temperatures.

In accordance with an aspect of the invention, the cowl cavity is ventilated rather than being pressure tight as required by U.S. Pat. No. 3,981,466.

In accordance with system and method aspects of the invention, the air used by the Environmental Control System and wing TAI System is conditioned in the cowl rather than just the air going to the Environmental Control System as disclosed by U.S. Pat. No. 3,981,446. This feature provides more heat to the cowl surface in icing conditions.

Other facets of the invention will become apparent from the following detailed description. Thus, the detailed description of best modes of carrying out the invention is also a part of the description of the invention. Furthermore, it is contemplated that any of the various functions and features, which are independently disclosed or independently described, or described as a part of a particular system, subsystem and/or method, can be used in combination with any other disclosed function or features, or as a part of any other disclosed system, subsystem and/or method, and such combination is a part of the invention.

BRIEF DESCRIPTION OF THE DRAWING

FIG. 5 is a longitudinal sectional view taken through the inlet lip portion of an engine cowl, showing an embodiment of indirect heat exchanger housed within the lip portion of the cowl, such view also showing inlet and outlet openings for ambient air in the cowl walls;

FIG. 6 is a view like FIG. 5, but showing a modified form of heat exchanger;

FIG. 7 is a view like FIGS. 5 and 6, but of yet another modified form of the heat exchanger;

BEST MODE FOR CARRYING OUT THE INVENTION

Figure 1:
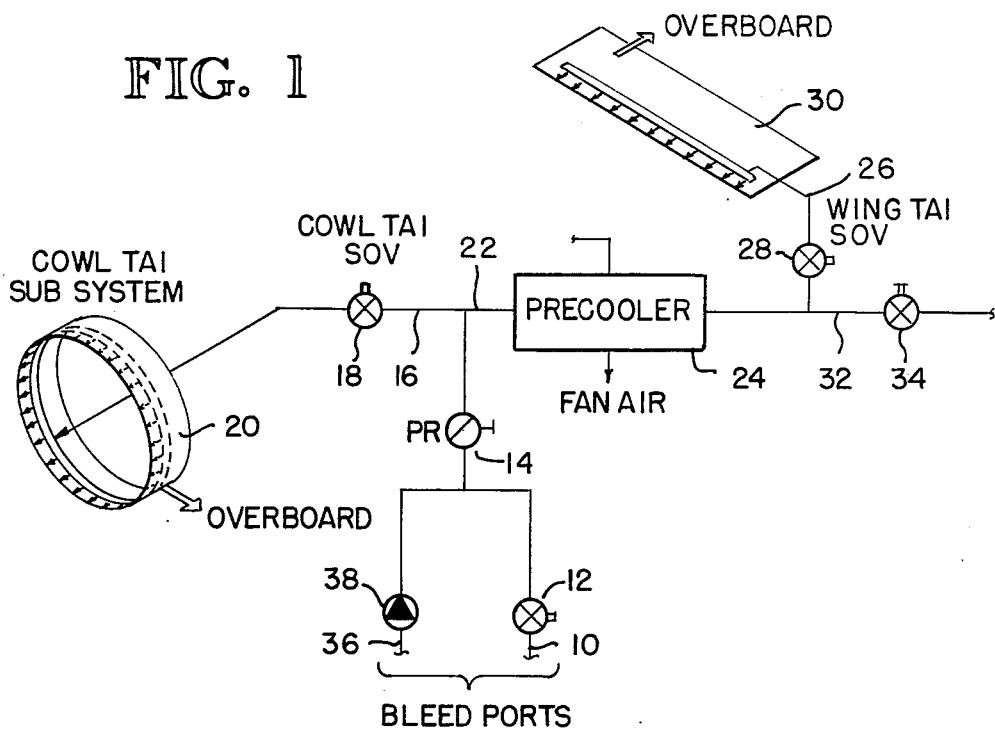
FIG. 1 is a schematic diagram of a a conventional integrated thermal anti-icing and environmental system.

FIG. 1, shows a typical current cowl and wing thermal anti-icing system integrated with other pneumatic services (cabin-conditioning). A study of the figure will show that the power demand of each service is independent of the other, and that the total pneumatic power demand is the total sum of the individual operating services. The TAI systems receive pneumatic power from the power source (engine), use the thermal energy and then dump the air overboard.

Specifically, high pressure bleed-air from an engine compressor is delivered through a supply duct 36, including a check valve 38, to a pressure regulating valve 14. Duct 10 with a control valve 12 serves as an alternate source of bleed-air from a higher engine compressor stage. After its pressure has been regulated to a desired level the bleed-air is distributed into two separate directions. A first portion is directed through a duct 16, including a control valve 18, to an annular chamber within the inlet cowl 20. After spending some time in the cowl chamber, to heat the cowl, to in that manner prevent icing at the inlet, the bleed-air is exhausted overboard. A second portion is delivered through a duct 22 including a precooler 24 in which it is brought into indirect heat exchange with cooler bleed-air from the engine fan. Some of the thus cooled air is delivered through a duct 26, which includes its own control valve 28, to TAI chambers within the aircrafts wing 30. After spending some time within the TAI chambers within the wing, such portion of the bleed-air is also dumped overboard. A second portion of the cooled bleed-air may be delivered through a duct 32 including a control valve 34, to other pneumatic services (e.g. Environmental Control Systems) on board the airplane.

Typically thermal anti-icing systems of the type shown by FIG. 1 have a heat-exchange effectiveness (or system thermal efficiency) in the range of 40–60% and as such large amounts of energy are dumped overboard. This low figure for thermal efficiency, does not admittedly, have a significant impact on the overall mission operating cost (fuel) of the pneumatic system, due to short duty cycle of these subsystems, but does have a significant impact on the pneumatic system design. This effect can be significant on modern high bypass ratio engines where only limited quantities of engine bleed-air are available. On twin engine airplanes, wherein a probability of an engine failure and/or bleed-air system malfunction exists, the high demand for pneumatic power imposed by systems designed according to current methods can force the designer to incorporate means such as load shedding or limiting bleed-air extraction so that engine bleed-air limits are not exceeded.

Figure 2:
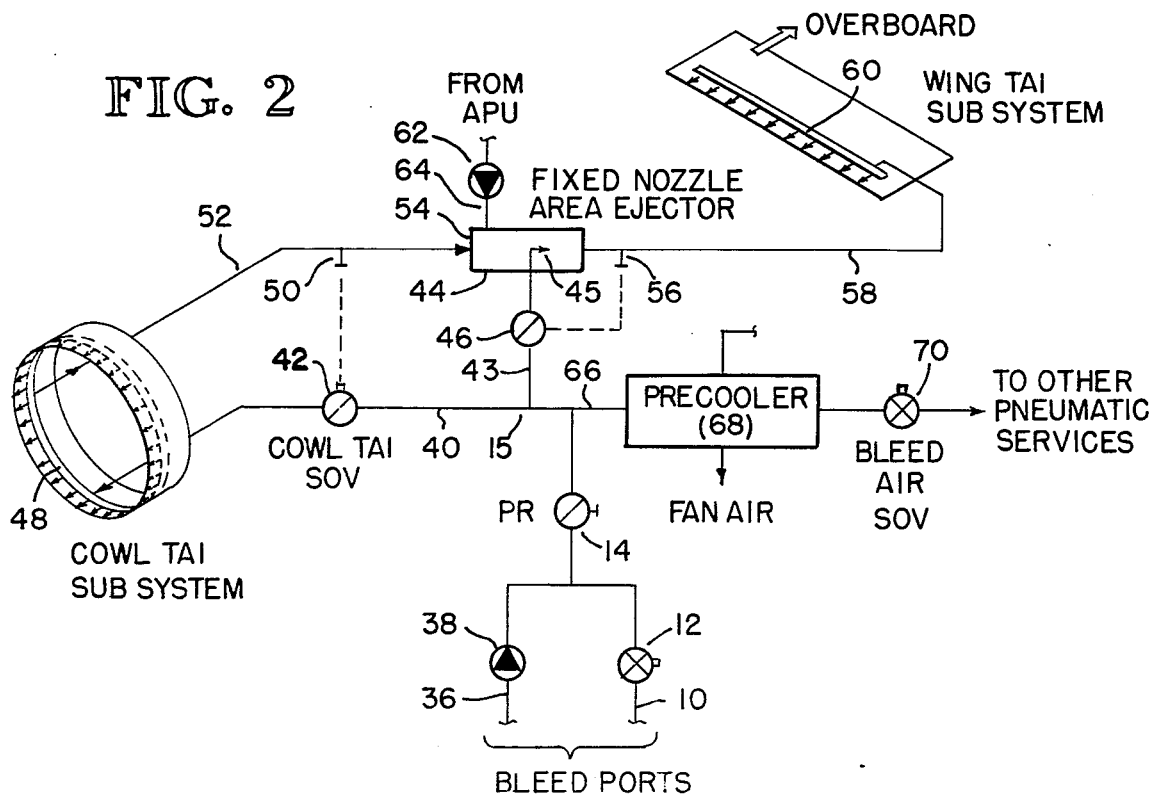
FIG. 2 is a schematic diagram of one embodiment of integrated thermal anti-icing and environmental control system embodying principles of the present invention.

A first system concept according to the present invention is shown by FIG. 2. High temperature and pressure bleed-air from the junction 15 in the ducting, downstream of the pressure regulator 14 (upstream components being like those in FIG. 1) flows into two ducts—a first duct 40 conveying air to the cowl TAI subsystem via its control valve 42, and a second duct 43 conveying air to the pumping or primary fluid nozzle 45 of a wing TAI subsystem mixing ejector 44 via its supplemental heat valve 46. The cowl TAI valve 42 and the supplemental heat valve 46 are normally closed valves that are remotely controlled by either their respective switches labeled cowl TAI and wing TAI or by a single switch labeled TAI on the crew panel. On crew command, the valves 42 and 46 go to open positions. The bleed-air flows from junction 15 through the cowl TAI valve 42 to the cowl distribution system 48. A thermostat 50 within duct 52 leading from cowl system 48 to the pumped fluid inlet 54 of ejector 44 automatically modulates the cowl TAI valve 42 to insure that the sensed temperature is within design limits. The air after transferring part of its thermal energy to the cowl surface in system 48, flows to the wing TAI subsystem mixing ejector 44 via the duct 52 as ejector secondary air (i.e. the pumped fluid). A second thermostat 56 in duct 58 downstream of ejector 44 senses the temperature of air downstream of the mixing ejector 44, and modulates the supplemental heat valve 46 such that the temperature of air at the location of thermostat 56 is maintained within design tolerance band.

The mixing ejector 44 primarily serves as a device for mixing two different temperature streams, and its function as a pumping device is only secondary. The ejector exhaust flows through duct 58 to the wing TAI distribution duct 60 from where the air after transferring its heat content to the wing surface, flows overboard, in known fashion (e.g. see U.S. Pat. No. 3,058,695).

Figure 3:
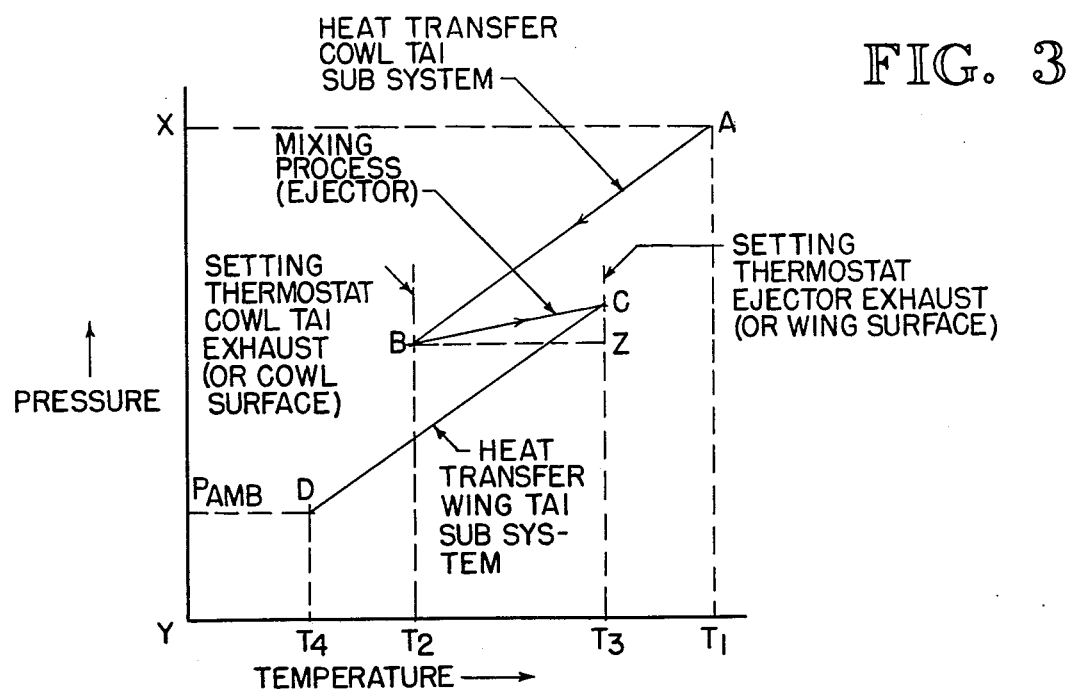
FIG. 3 is a pressure verses temperature graph of the system shown by FIG. 2.

The system operation on a pressure/temperature chart is shown in FIG. 3, wherein State A represents the condition of air entering the cowl TAI distribution duct. State B represents the condition of cowl TAI exhaust air entering the mixing ejector. State C represents the condition of air entering the wing TAI distribution duct; and State D represents the condition of air exhausting overboard. Process AB represents the heat transfer and pressure drop in the cowl TAI subsystem. Process BC represents the operation of the mixing ejector. Process CD represents the heat transfer and pressure drop in the wing TAI subsystem. Area $XAT_1Y$ represents thermal energy/lb. of air supplied to the cowl subsystem. Area BCZ represents the thermal energy/lb. of air supplied by the supplemental heat valve. Area $AT_1T_2B$ represents the thermal energy/lb. of air transferred to the cowl surface. Area $CT_3T_4D$ represents the thermal energy/lb. of air transferred to the wing surface.

The system of FIG. 2 includes a checkvalve 62 in a duct 64 in communication with the ejector secondary path which functions as a passive safety device. In the event of a malfunction of the supplemental heat valve 46 (failed open) in presence of cowl TAI valve (42) malfunction (failed closed), checkvalve 62 permits the ejector to automatically induce ambient air into the secondary path to reduce the temperature of air supplied to the wing TAI subsystem. It also protects the cowl system 48 from exposure to negative pressures.

In the event of malfunction of the supplemental heat valve 46 (failed closed), the system of FIG. 2 provides a degraded performance of the wing TAI subsystem by virtue of cowl TAI exhaust air alone flowing through the wing TAI distribution duct.

From a study of the concept that has been described, it will be readily apparent that the disclosed invention utilizes the bleed-air used to perform the cowl thermal anti-icing function to sequentially perform the wing TAI function. This should result in a lower pneumatic load when the on-demand TAI services are commanded on. Also, it should be noted that the wing TAI system is automatically operating when the cowl TAI system is commanded on, and this should result in lower crew work load.

Additional bleed-air from pressure regulator 14 may be directed into a service duct 66 which includes a precooler 68 (like precooler 24 in FIG. 1) and an on-off valve 70. Air in service duct 66 is supplied to other pneumatic services (e.g. cabin conditioning) aboard the airplane.

The system of FIG. 2 can be used on all types of aircraft in which protection of both engine and wing surfaces from icing is required.

Another aspect of the invention involves a system and method for integrating cowl and wing thermal anti-icing systems with an environmental control system (ECS) such that a reduction in peak load is achieved and the cowl is not subjected to high pressures and temperature (a short coming of the system disclosed in U.S. Pat. No. 3,981,446). To achieve the above, the integrated system utilizes a new concept for anti-icing the cowl by the use of a preferably finned duct (or ducts) 88 (FIG. 4) that is contained within the lip of the inlet.

Figure 4:
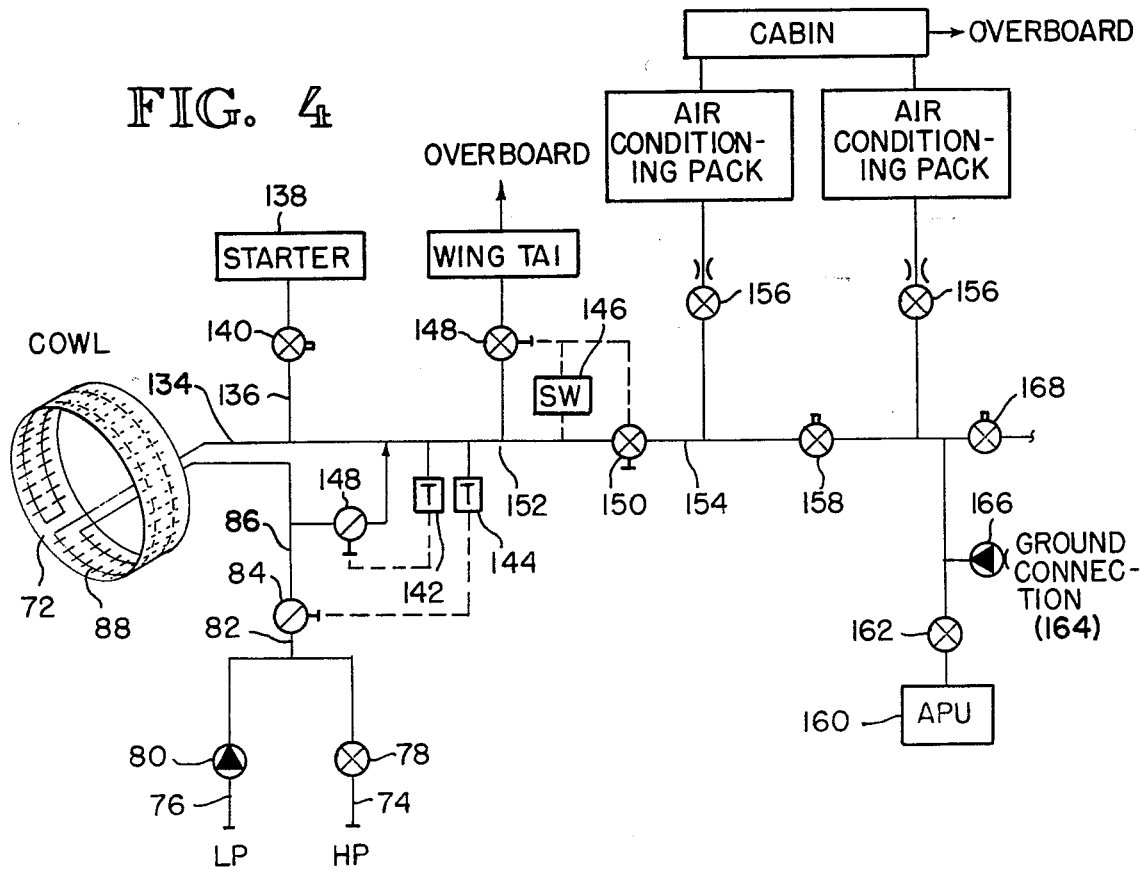
FIG. 4 is a schematic diagram of another integrated thermal anti-icing and environmental control system embodying principles of the present invention.

FIG. 4, shows schematically an integrated cowl/wing TAI and cabin environmental control system, utilizing the finned duct cowl thermal anti-icing concept mentioned above. The schematic shows a candidate system for a twin engine (wing mounted) airplane, wherein the bleed-air, after rejecting its thermal energy in the cowl lip 72, is used to perform the wing TAI (if system is commanded on) and environmental control system functions.

Referring to FIG. 4, bleed-air is extracted from the bleed-air source(s) of the engine (two sources 74 and 76 are shown) by the bleed-air source selection system.

The bleed-air, after passing through its control valves 78, 80, flows into the common duct 82. A pressure regulator 84 throttles the upstream pressure as required to maintain the pressure in the downstream duct 86 at the regulator setting. Air from the duct 86 flows into a duct 88 located within the lip of the cowl. It is preferred that the duct 88 be finned on its external surface to increase heat transfer. FIG. 5, shows significant details of an embodiment of the duct 88 and its installation in the cowl 72.

Referring to FIG. 5, the finned duct 88 is located within an annular lip chamber 90 close to the leading edge 92 of the cowl 72. Along the periphery of the cowl are located holes (or slots) 94, 96 and 98. These holes or slots 94, 96, 98 permit the cowl to communicate with the ambient, and are preferably scattered in relation to each other such that short-circuiting of induced ventilation air is minimized. The purpose of these holes is to enhance heat transfer from the finned duct 88 and the function they perform is as follows:

1. During ground operation (static), with low pressure created by the engine at the location of holes or slots 94, (which are located near the inlet throat) ambient air flows into the cowl cavity through holes or slots 96, 98. The air motion in the cavity 90 enhances the convective heat transfer from the external surface of the duct 88 (for low velocities, $h = 2.0 + 0.314 V$, where V is the velocity in ft/sec and h the heat transfer coeff in $BTU/hr\text{-}ft^2/°F$.). The air exhausting out of holes 94 carries away part of the rejected thermal energy and part of such heat escapes out of the cavity 90 by process of heat transfer from the skin of the cowl 72. Noting that as engine power is advanced, both the suction pressure at the holes (at location 94) and bleed-air temperature in duct 88 increases, it is apparent that the system self adjusts the duct (88) external heat transfer coefficient as a function of bleed-air temperature. This feature permits the cooling of bleed-air within desired temperature limits.

2. In flight with high ram-air pressure in the vicinity of cowl leading edge 92, ambient air flows through the holes 96 into the cavity 90 and is dumped overboard through the holes 94 and 98 where the local pressure is lower.

The induced ventilation through the cavity 90 serves three purposes:

(a) It enhances the duct (88) external convective heat transfer coefficient.

(b) It serves as a heat sink, taking away some of the heat rejected.

(c) It provides a homogeneous mass of high temperature air in the cavity (90), thus minimizing large temperature gradients on the cowl surfaces.

By careful selection of fin spacing and geometry and the amount of induced ventilation, the required cowl TAI performance and bleed-air cooling can thus be effected. The salient features of this cowl TAI system are:

1. The high pressure and temperature air is contained within a duct 88 which is less expensive to design and fabricate.

2. The cowl structure 72 is not subjected to high pressures and temperatures.

3. Design flexibility exists in controlling the amount of heat rejection (viz. number and placement of holes or slots in cowl wall and number and placement of fins F on duct 88).

FIGS. 6 and 7 show alternate constructions of the duct in the cowl chamber 90. FIG. 6 shows a twin duct system 100 whereas FIG. 7 shows a multi-duct system 102 where the ducts 104, 106, 108, 110 maybe arranged in thermal contact with the cowl skin 112, 114 in a manner that the skin 112, 114 serves as a fin.

Figure 9:
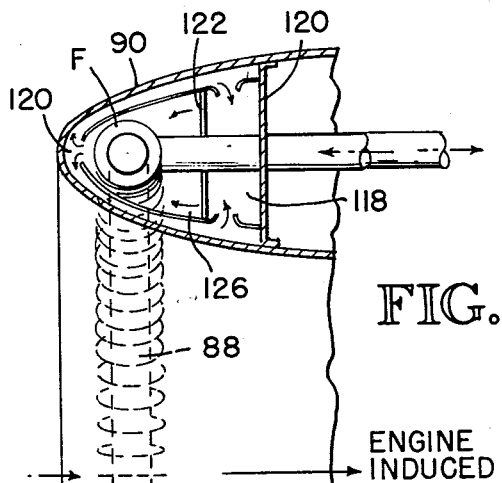
FIG. 9 is a view like FIGS. 5–7, but of a different system for circulating air from the heat exchanger to the surfaces of the cowl which are to be heated.

FIG. 9 shows an alternate heat exchange arrangement in the cowl wherein ventilation across the finned duct 88 is created by an air circulating fan 116 which may be thermostatically controlled and powered by electrical, pneumatic or hydraulic power. The fan inlet communicates with a plenum 118 formed by bulkheads 120 and 122. Fan 116 raises the pressure of the air and delivers the air to the plenum 126 from where the air flows over the finned duct 88 and into channels (formed by and between the plenum sidewall 124 and the cowl wall 72) through the holes/slots 128. The air after rejecting its heat to the inlet lip surfaces of the cowl flows back into the plenum 118 for a repeat of the above process.

Figure 10:
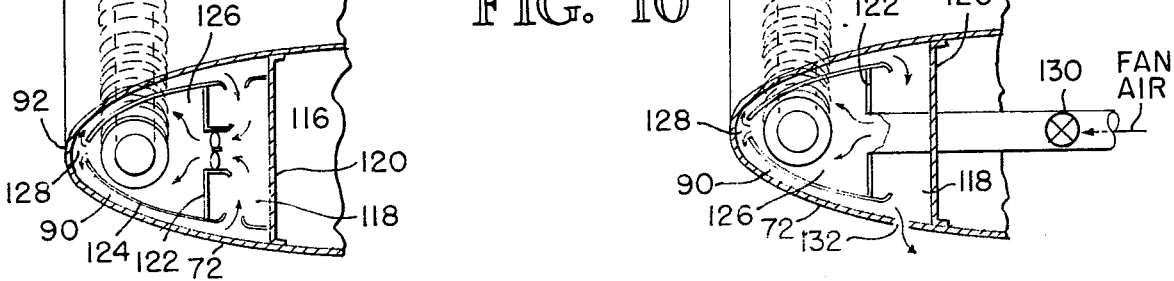
FIG. 10 is a view like FIGS. 5–7 and 9, showing yet another way of using air to transfer heat from the heat exchanger tube to the surfaces of the cowl which are to be heated.

FIG. 10 shows another alternate heat exchange arrangement in the cowl wherein the circulating fan is replaced by an external source of air, e.g. engine fan-air controlled by an inline valve 130 which maybe thermostatically controlled. In this embodiment the air collected in plenum 118 is dumped overboard via openings or slots 132.

In the preferred embodiments of this invention it is desired that heat be transferred from the bleed-air in the cowl duct to the inlet lip surfaces of the cowl in the most efficient manner. Coating the surfaces (cowl and/or finned duct) to enhance the transfer of heat by process of radiation may be utilized without deviating from the spirit of the invention.

Referring again to FIG. 4, the effluent air from the finned duct 88 (or a duct system as shown in FIGS. 6 or 7) enters a discharge duct 134 which includes a branch 136 connected to the engine starter 138 via its control valve 140. Also located in the duct 134 are two thermostats 142 and 144 and a thermal switch 146. The function of these devices is as follows:

(a) The thermostat 142 controls the minimum discharge air temperature in the duct 134. When the air temperature drops blow the thermostat setting, the thermostat causes a bypass valve 148 to open, allowing bleed-air in duct 86 to bypass the finned duct 88.

(b) The thermostat 144 controls the maximum discharge air temperature in the duct 134. When the air temperature exceeds the thermostat setting, the thermostat causes the pressure regulator 84 to regulate to a lower pressure (and hence reduce system flow).

(c) The thermal switch 146 is a safety device. Its setting is higher than the setting of thermostat 144 and it on activation automatically shuts off the wing TAI subsystem control valve 148 and bleed-air shut off valve 150 thus preventing high temperature air being supplied to the respective services downstream of junction 152.

The duct 134 is connected to the wing TAI system via its control valve 148 and the wing manifold via the bleed-air shut off valve 150. In the preferred embodiment of this invention, it is desired that the valves 148 and 150 include an automatic over pressure shut-off feature to safeguard the downstream subsystems from exposure to excessive pressure.

The duct 154 supplies air conditioning packs through control valve 156. In the duct 154 is also located an isolation valve 158 to isolate the right and left bleed-air systems. Duct 154 is connected to an auxiliary power 160 unit via its control valve 162 and a ground cart connection 164 via a check valve 166. Conduit 154 may continue through another bleed-air shut-off valve 168, similar to valve 150 and another air source aboard the airplane.

Figure 8:
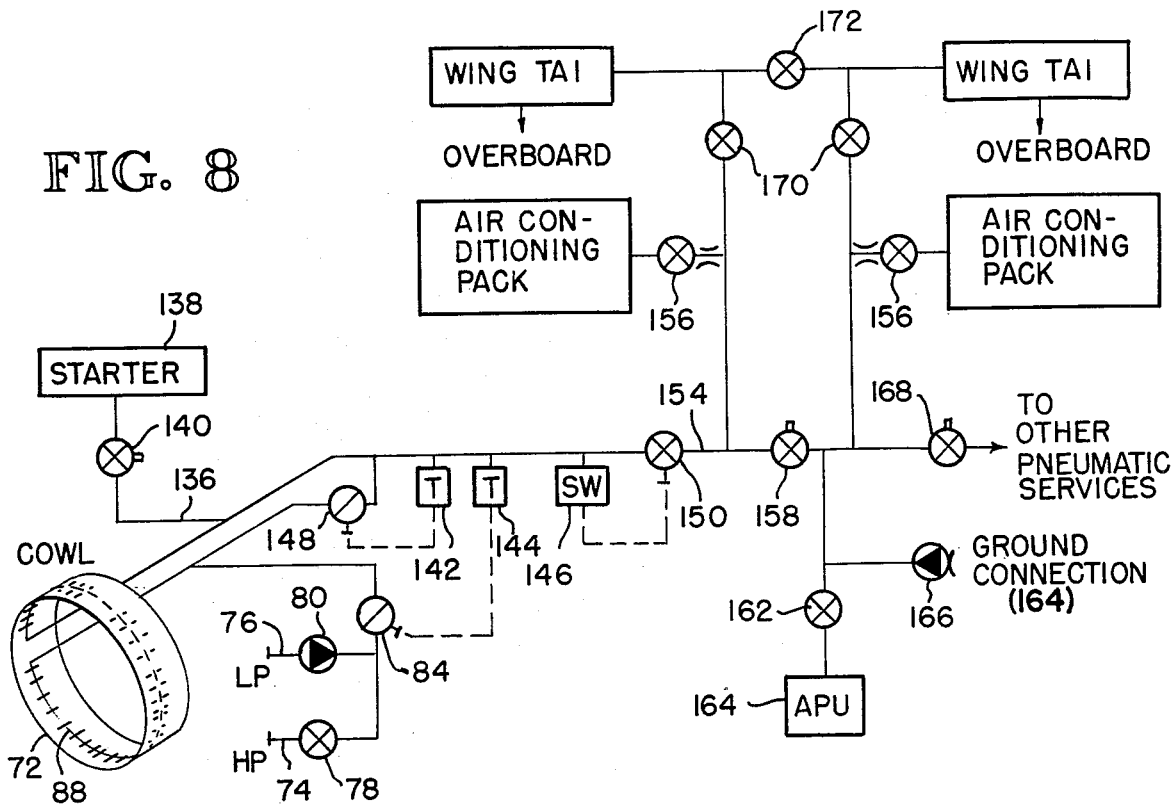
FIG. 8 is a schematic diagram of another embodiment of integrated thermal anti-icing and environmental control system, especially adapted for use in a tail mounted multiple engine type airplane.

FIG. 8 shows a schematic of a bleed-air system, employing principles of the disclosed invention, for a tail mounted twin engine airplane. Control valves 170, 172 are provided in the delivery ducts leading to the wing TAI subsystems.

The invention has been described using twin engine airplanes for the sake of simplicity. However, it is to be understood that the invention can be used for single and multi-engine airplanes by making modifications as necessary. For example, thrust reverser drives, flap drives, auxiliary hydraulic pump drives, fuel/air heater etc. can be supplied from the various manifolds without departing from the spirit of the invention.

While preferred embodiments of the invention have been illustrated and described, it will be appreciated by those skilled in the art and others that various changes can be made therein without departing from the spirit and scope of the invention. Hence, the invention can be practiced other ways than as specifically described herein.

The embodiments of the invention in which an exclusive property or privilege is claimed are defined as follows:

1. A pneumatic service system aboard an airplane, comprising:
   a source of hot compressed air;
   a first region requiring heat for combating ice formation including a flow through heat exchanger means having an inlet and an outlet;
   a second region requiring temperature conditioned compressed air;
   an air mixing station;
   first duct means delivering a first portion of the hot compressed air to the inlet of said heat exchanger means;
   second duct means delivering a second portion of the hot compressed air to the air mixing station;
   third duct means delivering air from the outlet of the heat exchanger means to the air mixing station;
   fourth duct means delivering mixed air from the air mixing station to said second region;
   wherein the first region requiring heat for combating ice formation is an engine inlet cowl having cowl wall means defining the leading edge portions of the inlet cowl and an internal wall defining with said cowl wall means an annular chamber inside the cowl;
   said heat exchanger means comprising circumferential tube means situated inside of said chamber through which the first portion of the hot compressed air flows; and
   means for circulating low pressure heat transfer air through the cowl chamber, said heat transfer air having a pressure that is lower than the pressure of said hot compressed air, for picking up heat from the first heat exchanger means and delivering it to the cowl wall means.

2. A system according to claim 1, further comprising heat transfer fins on the circumferential tube means.

3. A system according to claim 1, wherein said heat exchanger means comprises a plurality of tubular rings, some of which are in heat transfering contact with sidewall surface portions of the cowl chamber, to directly transfer heat thereto by conduction.

4. A system according to claim 1, wherein said cowl chamber includes inlet and outlet openings for ambient air.

5. A system according to claim 4, wherein at least some of the inlet openings are located in a forward portion of the cowl wall means, so that ambient air is rammed into such openings during airplane travel.

6. A system according to claim 4, wherein at least some of the outlet openings are formed in the cowl wall means where the local pressure is lower than at the inlet openings.

7. A system according to claim 6, wherein at least some of the inlet openings are located in a forward portion of the cowl wall means, so that ambient air is rammed into such openings during airplane travel.

8. A system according to claim 1, comprising inner wall means within said cowl chamber dividing said chamber into a forward plenum and a rearward plenum, with said heat exchanger tube means being located within the forward plenum, said inner wall means including a sidewall spaced inwardly from the cowl wall means, so as to define an air passageway between said walls, and openings in the inner wall means between the forward plenum and said passageway and further openings in said inner wall between a rearward portion of said passageway and the rear plenum, and means for moving air from the rear plenum into the forward plenum, whereby such air will flow around the heat exchanger tube means and pick up heat and will then flow out through the first openings into the air passageway and then from such passageway through the second openings back into the second plenum.

9. A system according to claim 8, wherein said air moving means is a mechanical fan means.

10. A system according to claim 1, comprising inner wall means within the cowl chamber dividing such chamber into a forward plenum and a rearward plenum, said wall means including a sidewall means spaced inwardly from the sidewall of the cowl wall means to define a passageway between them, wherein the heat exchanger tube means is housed within the forward plenum chamber;
   means for delivering low pressure and temperature heat transfer air into the forward plenum, to flow over and around the heat exchanger tube means;
   outlet openings in a nose portion of the inner wall means, through which heat transfer air flows out from the first plenum means into the passageway between the inner wall means and the cowl wall means, and additional passageway means in the inner wall means through which air from the passageway flows into the rear plenum, and dump openings in an outer rear sidewall portion of the cowl chamber, for discharging heat transfer air from the passageway and the second plenum to the atmosphere.

11. A pneumatic service system aboard an airplane, comprising:
   a source of hot compressed air;
   a first region requiring heat for combating ice formation including a first flow through heat exchanger means having an inlet and an outlet;
   a second region requiring heat for combating ice formation, including a second heat exchanger means having an inlet;

air mixing means having a primary air inlet, a secondary air inlet, a mixed air outlet, and an ambient air inlet including check valve means adapted to open in response to a drop in pressure within the air mixing means below the ambient pressure, to admit ambient air into the air mixing means as a second source of secondary air;

first duct means delivering a first portion of the hot compressed air to the inlet of said first heat exchanger means;

second duct means delivering a second portion of the hot compressed air to the primary air inlet of the air mixing means;

third duct means delivering air from the outlet of the first heat exchanger means directly to the secondary air inlet of the air mixing means; and fourth duct means delivering mixed primary and secondary air from the outlet of the air mixing means to the inlet of the second heat exchanger means.

12. A system according to claim 11, comprising means for sensing the temperature of air in the third duct means;

flow control valve means in the first duct means, and means for adjusting said flow control valve means in response to a change in temperature in the third duct means sensed by the temperature sensing means, for automatically controlling the flow rate of hot compressed air into the first heat exchanger means as a way of maintaining the air flowing through the third duct means at a desired temperature level.

13. A system according to claim 11, further comprising temperature sensing means in the fourth duct means;

flow control valve means in the second duct means; and means for regulating said flow control valve means in response to a change in temperature of the air flowing through the fourth duct means, for adjusting the flow rate of hot compressed air into the primary air inlet of the air mixing means as a way of maintaining the air which is delivered from the air mixing means to the second heat exchange at a desired temperature level.

14. A system according to claim 11, wherein the air mixing means is a fixed nozzle area type ejector and the primary air inlet is an ejector nozzle.

15. A system according to claim 11, wherein the first region requiring heat for combating ice formation is an engine inlet cowl having cowl wall means defining the leading edge portions of the inlet cowl and an internal wall defining with said cowl wall means an annular chamber inside the cowl; and the first heat exchanger means comprises circumferential tube means situated inside of said chamber through which the first portion of the hot compressed air flows.

16. A system according to claim 15, further comprising means for circulating heat transfer air through the cowl chamber, for picking heat fom the first heat exchanger means and delivering it to the cowl wall means.

17. A system according to claim 15, further comprising heat transfer fins on the circumferential tube means.

18. A system according to claim 15, wherein said first heat exchanger means comprises a plurality of tubular rings, at least some of which are arranged to be in thermal contact with the sidewall surface portions of the cowl chamber, to directly transfer heat thereto by conduction.

19. A system according to claim 15, wherein said cowl chamber includes inlet and outlet openings for ambient air.

20. A system according to claim 19, wherein at least some of the inlet openings are located in a forward portion of the cowl wall means, so that ambient air is rammed into such openings during airplane travel.

21. A system according to claim 19, wherein at least some of the outlet openings are formed in the cowl wall means where the local pressure is lower than at the inlet openings.

22. A system according to claim 21, wherein at least some of the inlet openings are located in a forward portion of the cowl wall means, so that ambient air is rammed into such openings during airplane travel.

23. A system according to claim 15, comprising inner wall means within said cowl chamber dividing said chamber into a forward plenum and a rearward plenum, with said heat exchanger tube means being located within the forward plenum, said inner wall means including a sidewall spaced inwardly from the cowl wall means, so as to define an air passageway between said walls, and openings in the inner wall means between the forward plenum and said passageway and further openings in said inner wall between a rearward portion of said passageway and the rear plenum, and means for moving air from the rear plenum into the forward plenum, whereby such air will flows around the heat exchanger tube means and picks up heat and will then flow out through the first openings into the air passageway and then from such passageway through the second openings back into the second plenum.

24. A system according to claim 23, wherein said air moving means is a mechanical fan means.

25. A system according to claim 15, comprising inner wall means within the cowl chamber dividing such chamber into a forward plenum and a rearward plenum, said wall means including a sidewall means spaced inwardly from the sidewall of the cowl wall means to define a passageway between them, wherein the heat exchanger ring means is housed within the forward plenum chamber;

means fo delivering low pressure and temperature heat transfer air into the forward plenum, to flow over and around the heat exchanger tube means;

outlet openings in a nose portion of the inner wall means, through which heat transfer air flows out from the first plenum means into the passageway between the inner wall means and the cowl wall means, and additional passageway means in the inner wall means through which air from the passageway flows into the rear plenum, and dump openings in a sidewall portion of the cowl chamber, for discharging heat transfer air from the passageway and the second plenum to the atmosphere.

26. A pneumatic service system aboard an airplane, comprising:

a source of hot compressed air;

a first region requiring heat for combating ice formation including a first flow through heat exchanger means having an inlet and an outlet;

a second region requiring heat for combating ice formation, including a second heat exchanger means having an inlet;

air mixing means positioned between the first and second regions, said air mixing means having a primary air inlet, a secondary air inlet and a mixed air outlet;

first duct means delivering a first portion of the hot compressed air to the inlet of said first heat exchanger means;

second duct means delivering a second portion of the hot compressed air to the primary air inlet of the air mixing means;

third duct means delivering air from the outlet of the first heat exchanger means directly to the secondary air inlet of the air mixing means;

fourth duct means delivering mixed primary and secondary air from the outlet of the air mixing means to the inlet of the second heat exchanger means;

means for sensing the temperature of air in the third duct means;

flow control valve means in the first duct means;

means for adjusting said flow control valve means in response to a change in temperature in the third duct means sensed by the temperature sensing means, for automatically controlling the flow rate of hot compressed air into the first heat exchanger means as a way of maintaining the air flowing through the third duct means at a desired temperature level;

temperature sensing means in the fourth duct means;

flow control valve means in the second duct means; and means for regulating said flow control valve means in response to a change in temperature of the air flowing through the fourth duct means, sensed by said second temperature sensing means, for adjusting the flow rate of hot compressed air into the primary air inlet of the air mixing means as a way of maintaining the air which is delivered from the air mixing means to the second heat exchange means at a desired temperature level for use in the second heat exchanger means.

27. A system according to claim 26 wherein the air mixing means is a fixed nozzle area type ejector and the primary air inlet is an ejector nozzle.

28. A pneumatic service system aboard an airplane, comprising:

a source of hot compressed air;

a first region requiring heat for combating ice formation including a first flow through heat exchanger means having an inlet and an outlet;

a second region requiring heat for combating ice formation, including a second heat exchanger means having an inlet;

air mixing means positioned between the first and second regions, said air mixing means having a primary air inlet, a secondary air inlet and a mixed air outlet;

first duct means delivering a first portion of the hot compressed air to the inlet of said first heat exchanger means;

second duct means delivering a second portion of the hot compressed air to the primary air inlet of the air mixing means;

third duct means delivering air from the outlet of the first heat exchanger means directly to the secondary air inlet of the air mixing means;

fourth duct means delivering mixed primary and secondary air from the outlet of the air mixing means to the inlet of the second heat exchanger means;

means for sensing the temperature of air in the third duct means;

flow control valve means in the first duct means;

means for adjusting said flow control valve means in response to a change in temperature in the third duct means sensed by the temperature sensing means, for automatically controlling the flow rate of hot compressed air into the first heat exchanger means as a way of maintaining the air flowing through the third duct means at a desired temperature level;

wherein the first region requiring heat for combatting ice formation is an engine inlet cowl having cowl wall means defining the leading edge portions of the inlet cowl and an internal wall defining with said cowl wall means an annular chamber inside the cowl;

the first heat exchanger means comprises circumferential tube means situated inside of said chamber through which the first portion of the hot compressed air flows; and means for circulating low pressure heat transfer air through the cowl chamber, said heat transfer air having a pressure that is lower than the pressure of said hot compressed air, for picking up heat from the first heat exchanger means and delivering it to the cowl wall means.

29. A system according to claim 28, further comprising heat transfer fins on the circumferential tube means.

30. A system according to claim 28, wherein said first heat exchanger means comprises a plurality of tubular rings, at least some of which are arranged to be in thermal contact with the sidewall surface portions of the cowl chamber, to directly transfer heat thereto by conduction.

31. A system according to claim 28, wherein said cowl chamber includes inlet and outlet openings for ambient air.

32. A system according to claim 31, wherein at least some of the inlet openings are located in a forward portion of the cowl wall means, so that ambient air is rammed into such openings during airplane travel.

33. A system according to claim 31, wherein at least some of the outlet openings are formed in the cowl wall means where the local pressure is lower than at the inlet openings.

34. A system according to claim 33, wherein at least some of the inlet openings are located in a forward portion of the cowl wall means, so that ambient air is rammed into such openings during airplane travel.

35. A system according to claim 28, comprising inner wall means within said cowl chamber dividing said chamber into a forward plenum and a rearward plenum, with said heat exchanger tube means being located within the forward plenum, said inner wall means including a sidewall spaced inwardly from the cowl wall means, so as to define an air passageway between said walls, and openings in the inner wall means between the forward plenum and said passageway and further openings in said inner wall between a rearward portion of said passageway and the rear plenum, and means for moving air from the rear plenum into the forward plenum, whereby such air will flow around the heat exchanger tube means and pick up heat and will then flow out through the first openings into the air passageway and then from such passageway through the second openings back into the second plenum.

36. A system according to claim 35, wherein said air moving means is a mechanical fan means.

37. A system according to claim 28, comprising inner wall means within the cowl chamber dividing such chamber into a forward plenum and a rearward plenum, said wall means including a sidewall means spaced inwardly from the sidewall of the cowl wall means to define a passageway between them, wherein the heat exchanger tube means is housed within the forward plenum chamber;

means for delivering low pressure and temperature heat transfer air into the forward plenum, to flow over and around the heat exchanger tube means; outlet openings in a nose portion of the inner wall means, through which heat transfer air flows out-from the first plenum means into the passageway between the inner wall means and the cowl wall means, and additional passageway means in the inner wall means through which air from the passageway flows into the rear plenum, and dump openings in a sidewall portion of the cowl chamber, for discharging heat transfer air from the passageway and the second plenum to the atmosphere.

* * * * *